(12) United States Patent
Rysgaard

(10) Patent No.: US 6,247,278 B1
(45) Date of Patent: Jun. 19, 2001

(54) SEWAGE DIGESTER CAP

(76) Inventor: Thomas A. Rysgaard, 21877 Harrow Ave. N., Forest Lk, MN (US) 55112

( * ) Notice: Subject to any disclaimer, the term of this patent is extended or adjusted under 35 U.S.C. 154(b) by 0 days.

(21) Appl. No.: 09/410,304

(22) Filed: Oct. 1, 1999

(51) Int. Cl.[7] .................................................. E04H 7/00
(52) U.S. Cl. ................................................ 52/192; 52/20
(58) Field of Search .................... 52/19, 20, 21, 52/3, 192

(56) References Cited

U.S. PATENT DOCUMENTS

| | | |
|---|---|---|
| 234,291 | 11/1880 | King . |
| 251,245 | 12/1881 | King . |
| 663,623 | 12/1900 | Cameron . |
| 1,717,100 | 6/1929 | Downes . |
| 1,906,685 | 5/1933 | Wiggins . |
| 1,989,589 | 1/1935 | Fischer . |
| 2,050,686 | 8/1936 | Wiggins . |
| 2,274,451 * | 2/1942 | Kyle ........................................ 52/20 |
| 2,373,797 | 4/1945 | Wilkin . |
| 4,053,395 | 10/1977 | Switzgable . |
| 4,378,437 | 3/1983 | Cook . |
| 4,391,705 | 7/1983 | Cook . |
| 4,565,552 | 1/1986 | Cotton . |
| 4,648,968 | 3/1987 | Cutler . |
| 4,659,251 * | 4/1987 | Petter et al. ........................... 52/20 X |
| 4,861,186 * | 8/1989 | Ferns ...................................... 52/20 X |
| 5,092,482 | 3/1992 | Wight et al. . |
| 5,117,593 * | 6/1992 | Tiernan ..................................... 52/20 |
| 5,238,844 | 8/1993 | Wight et al. . |
| 5,394,650 * | 3/1995 | Dean ...................................... 52/20 X |
| 5,423,895 | 6/1995 | Wight et al. . |
| 5,772,361 * | 6/1998 | Gavin ..................................... 52/20 X |

* cited by examiner

Primary Examiner—Peter M. Cuomo
Assistant Examiner—Stephen Vu
(74) Attorney, Agent, or Firm—Janet Peyton Schafer

(57) ABSTRACT

A sewage digester cap for use with a generally cylindrical tank, the cap held in place by a series of concrete anchors to ballast the cap on the digester. The anchors are suspended from the cap by a series of steel cables. The cap includes a liquid sealing skirt of a length to maintain the liquid seal in the presence of a high liquid level within the tank. The cap has removable anchors allowing the digester to be adjusted to accommodate different gas pressures inside the tank by using different ballast weights. The anchors remain submerged even when the maximum liquid level is reached allowing for increased gas storage with minimal pressure change. Additionally, the anchors provide a lower center of gravity for the cap which also reduces the tendency of the cap to tip in the wind or other atmospheric conditions. The cap is removable to allow for cleaning, maintenance and disassembly for relocation of the cap.

16 Claims, 2 Drawing Sheets

SEWAGE DIGESTER CAP

BACKGROUND

This invention is generally directed at a cap for sewage digesters. This invention is specifically directed at a sewage digester cap assembly which floats on an envelope of gas generated by decomposing sludge, the cap held in place by removable ballast anchors.

Heretofore, it was common to use gas holding covers having solid concrete blocks attached to the lower end of the side skirt of the cover to add extra weight to the cover to increase the pressure of the gas contained within the digester. When the concrete block skirt ballasts were submerged in the sludge, a buoyant force was exerted by the sludge upon the skirt members. Concrete used in ballast members generally has a density of about 150 pounds per cubic foot. A cubic foot of concrete in a submerged condition in sludge has a specific gravity of about 1.4 and an effective weight which is reduced by the weight of a cubic foot of sludge. Thus, in a submerged condition, one cubic foot of a solid concrete ballast exerts a downward force of about 87.6 pounds.

When these ballast members emerge from the sludge, then the effective weight of the concrete is its normal density, i.e. about 150 pounds per cubic foot. Typically, the operating pressure of a digester is that of the skirt ballast when it is raised above the corbels, but still in a submerged condition. If the ballast members are fully emerged from the sludge, the pressure generated is great enough to "blow" the system and the gas dissipates into the atmosphere.

Prior sewage digesters having a tank and a cap are provided having as an internal sealant a water seal between the tank and cap. Digested sewage produces methane gas. The cap contains that gas until such time as it is bled off for secondary use. Additional current models use external concrete ballast to offset the pressure of the gas inside the digester on the cap. The concrete is placed in a box adjoining the perimeter of the cap. Once the cap is in place, the "skirt" adjoining the perimeter of the cap is filled with concrete. Removal of the cap for cleaning, etc., thereafter is difficult. The cap travels a limited distance up and down within the digester, ex. 4 ft. At a predetermined pressure, the travel is limited by the high and low liquid levels into the digester. Travel beyond the high liquid level requires an increase in the pressure to raise the additional weight causing the system to "blow", releasing stored gas into the atmosphere. The increased pressure pulls the ballast out of the liquid so that instead of providing the submerged weight of 87.6 lbs./cu.ft. as ballast, the un-submerged concrete provides 150 lbs./cu. ft. as ballast. Increasing the amount of gas increases the internal pressure to a breaking point.

Numerous sewage digesters have been provided in the prior art that are adapted to include an open tank with a roof having peripheral flanges that travel vertically up and down the tank wall in response to either change in pressure or change in volume within the tank. A roof can be of a limber sheet or a rigid member. A central support, or corbel, inside the tank, supports the roof at a minimum level. Spring biasing means have been used to provide stability to the roof in prior art models to insure its remaining in a properly balanced condition resisting forces exerted on the roof in a direction throwing off balance of the roof. The roof is sealed by the liquid on which the roof floats.

Another digester discloses a floating cover arrangement that is provided with a pontoon construction that defines the peripheral wall. An additional digester has a flexible diaphragm that is vertically movable as a floating roof. An additional digester teaches telescoping or expansion of a movable roof or with counterbalancing plurality of weights connected externally by means of a balancing chain. In many digesters, a liquid seal is formed near the bottom edge of the sidewall trapping gas between liquid in the tank and the cover, buoying the cover upwardly. Some digesters have long side-skirts to maintain the ballast in a submerged condition in the fluctuating level of sludge within the digester.

Typically, sludge digesters operate with fresh sludge continuously entering the digester while sludge which has been decomposed exits the digester, either continuously or periodically. Gas is continually evolving within the digester due to the decomposition of organic matter within the sludge. The rate at which gas evolves is generally dependent upon the amount and type of organic matter in the sludge, the temperature of the sludge, the concentration and type of bacteria in the sludge as well as pH.

While these units may be suitable for the particular purpose to which they address, they would not be as suitable for the purposes of the present invention as hereinafter described.

SUMMARY

The present invention is directed to a cap for a sewage digester that satisfies these needs to provide an economical sewage digester cap having a series of removable anchors permitting the cap to be removed for tank cleaning, tank maintenance, cap disassembly for relocation and cap adjustment for different pressures by use of different ballast weights. Also, the digester cap of this invention provides for a cap having a lower center of gravity to reduce the tendency of the cap to tip in windy conditions resulting in system failure. A sewage digester cap assembly having features of the present invention comprises a cap that uses a series of concrete anchors as ballast to hold the cap on the digester, each of the anchors suspended from the perimeter of the cap by a steel cable. Because the anchor is not a part of the cap, and the cap has a handle on the top surface thereof, the anchors can be detached from the cap and the cap can be removed, by a crane or other lifting means, permitting access to the digester interior for removal of grit and sediment that has settled to the bottom of the digester. Because the collection of grit and sediment would inhibit the amount of liquid sewage that may be pumped into the digester, by providing a removable cap, the sewage digester can be accessed for cleaning permitting this grit and sediment to be periodically removed to provide more room for liquid sewage to be pumped in the digester. Additionally, the cap, because it has removable anchors, can be adjusted for different pressures by installation of different anchor weights permitting an accumulation of greater or lesser gas pressure as needed. The cap is able to be moved up and down because the cap, connected liquid sealing skirt, the series of cables and the respective anchor move as one unit responding to the pressure within the collection tank, especially a digester. It is an important feature of the present invention, that because of the adjustable feature of the ballast anchors, accommodation of an increased amount of gas is permitted without increasing the size of the digester. A user adds more weight to the anchor to accommodate an increase in internal pressure. In the present invention, the tank does not have to be emptied before any work can be done inside the tank. The gas must be bled off before the cap is removed to insert different weight anchors. In the present invention increased amounts of gas are maintained at the same pressure as the liquid is under during intake and output, e.g. ¼ psi–½ psi, because the heavier anchors remain submerged when the cap travels upwardly and downwardly because of lengthened cables. Because the cap is designed and manufactured when the dimensions of the tank are known, these dimensions include the height of the corbels above the bottom of the tank, the amount of gas pressure to be accommodated, and the high and low liquid levels in the tank. A liquid sealing skirt is provided of a length such that when the skirt rests on the corbel, a portion of the skirt extends above the high operating liquid level permitting increased amounts of gas to be collected. A stop is positioned to limit upward travel of the cap. The liquid seal is maintained when the cap is in this maximum elevated position, because the bottom edge of the skirt remains submerged. The cable is provided of a length to keep the bottom edge of the skirt submerged when the cap moves between the high liquid and low liquid levels in the tank. Because the anchors are positioned below the skirt and because the anchors depend downwardly from the cap, the anchors will always be submerged. Because the anchors remain submerged, they allow for increased gas storage with minimal pressure change. If the cap rises to a point at which the skirt comes out of the liquid, it will break the liquid seal and relieve the gas pressure. A stop prevents the cap from rising to this position. A gas relief valve is provided to prevent the system from blowing up. Further, the cap can travel a greater distance because there is no concrete skirt to inhibit the distance traveled while maintaining a constant pressure. Additionally, in the present system, the cap can be removed to adjust the size of the anchors to retro-fit the system to a different predetermined pressure. The collected gas must be bled off before the cap may be lifted, however, the tank does not have to be emptied prior to work being done within the tank.

The cap system can be used with different types of materials used as cap materials. In the preferred embodiment, fiberglass reinforced sections form ribs which are joined together by a fabric component to form the cap. A second embodiment provides for sections formed entirely of fiberglass. Additionally metal or other resilient materials could be used. In both preferred embodiments, the skirt portion of the cap is formed of fiberglass reinforced product although other materials could be used. The anchors are of concrete although other inexpensive, heavy materials could be used. Flexibility in the number of sections that may be joined together to form the cap provides a further adjustability factor in this digester system.

In the present system the cap can be retrofit to accommodate pre-existing digester tanks.

BRIEF DESCRIPTION OF THE DRAWINGS

Understanding of the invention will be enhanced by referring to the accompanying drawing, in which like numbers refer to like parts in the several views and in which.

DETAILED DESCRIPTION OF THE CURRENTLY PREFERRED EMBODIMENTS

Understanding of the invention will be further enhanced by referring to the following illustrative but non-limiting example.

Provided is a collecting and treating tank having a vertically cylindrical tank with a bottom fixed to the generally circular side wall, the tank for holding liquids and gas such as a sewage digester. A cap assembly is provided as a cover for the open tank. The cap assembly includes a series of removable anchors, received inside the tank, provided as anchor points to attach the cap to the tank. The anchors are connected to the cap by a series of cables. The cap assembly includes a cap, a liquid sealing skirt, a series of cables and anchors that move within a vertical plane as a unit. The cap assembly can be adjusted vertically to accommodate differing amounts of internal gas pressure in the tank. Because the anchors attached to the cap of this invention are continuously submerged, increased amounts of gas are able to be accommodated above the liquid within the tank yet the internal pressure is maintained at the intake pressure level. Additionally, the cap assembly may be removed from the tank for cleaning of the tank interior.

Figure 1:
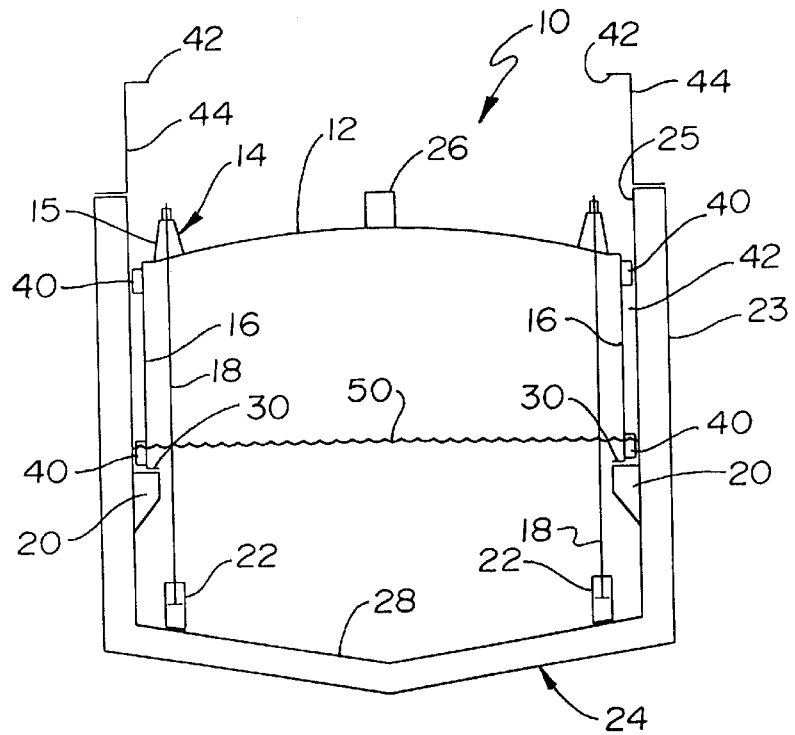
FIG. 1 is a cross-sectional view of the device of the invention in its place of use.

Turning now to the drawings, in which like reference characters refer to corresponding elements throughout the several views, FIG. 1 illustrates a generally cylindrical collecting tank 24 having an exterior, generally vertical exterior side wall 23 and an interior side wall 25. Connecting the generally cylindrical interior wall 25 is tank bottom 28. In the embodiment shown, bottom 28 is an inverted conical shape although other shapes could be used. The inverted conical shape allows the heavier materials, eg.grit, fully digested material, to accumulate in a central position for removal.

Mounted along the interior wall 25 of tank is a series of corbels 20 projecting inwardly from the interior tank wall 25. The corbels 20 could also be formed as a continuous projection around the interior wall 25 although this would require additional materials. The usual digester collecting tank 24 is of concrete materials although other materials, such as ceramics, metals, and fiberglass could be used. Corbels 20 are also of concrete materials. Tank 24 is formed prior to installation with corbels 20 in place. Because the cap assembly 10 is designed and manufactured when the dimensions of the tank 24 are known, these dimensions include the height of the corbels 20 above the bottom 28 of the tank 24, the amount of gas pressure to be accommodated, and the high and low liquid levels in the tank 24. A liquid sealing skirt 16 is provided of a length such that when the liquid sealing skirt 16 rests on the corbel 20, a portion of the skirt 16 extends below a high operating liquid level maintaining the liquid seal. Additionally, guide rollers 40 are mounted on the tank side of liquid sealing skirt 16. These guide rollers 40 guide the cap assembly 10 to maintain it in a central position within the tank 24. Additionally, guide rollers 40 prevent the cap assembly 10 from tipping and becoming wedged within tank 24. A stop 42 is positioned above the top edge of the tank 24 on a stanchion 44 or the like, to limit the upward travel of the cap assembly 10. The liquid seal is maintained even when the cap assembly 10 is in this maximum elevated position, because the bottom edge or flange 30 of the skirt 16 remains submerged. The series of cables 18 are provided of a length to keep the bottom edge or flange 30 of the skirt 16 submerged when the cap assembly 10 moves between the high liquid, FIG. 4, and low liquid level 50, FIG. 1, in the tank 24. Because the anchors 22 are positioned below the skirt 16 and because the anchors 22 depend downwardly from the cap 12, the anchors 22 will always be submerged. Because the anchors 22 remain submerged, they allow for increased gas storage with minimal pressure change, an important feature of the present invention. If the cap 12 rises to a point at which the skirt 16 comes out of the liquid, it would break the liquid seal and relieve the gas pressure. A stop 42 positioned adjacent the tank on a stanchion 44 or the like extending above the tank 24, prevents the cap 12 from rising to a level to break the liquid seal. A gas relief valve, not shown, is provided in the tank system 24 to prevent the system from blowing up in such a circumstance. The cap assembly 10 can travel a greater distance than in the previous embodiments because there is no concrete skirt to inhibit the distance the cap assembly 10 travels while maintaining a constant pressure. Additionally, in the present system, a handle 26 is provided to permit the cap 12 to be removed to adjust the size of the anchors 22 to retro-fit the system to accommodate a different predetermined pressure, for maintenance and repair of the tank system and for removal of the cap for use elsewhere. The gas is bled from the tank 24 prior to removal of cap 12 in the process of changing anchors 22.

Figure 2:
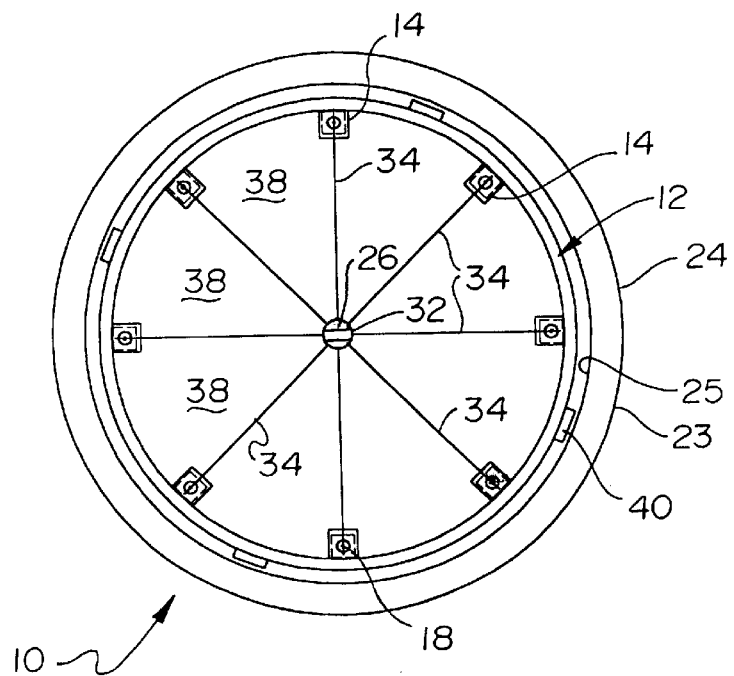
FIG. 2 is a top plan view of the first embodiment cap.
Figure 3:
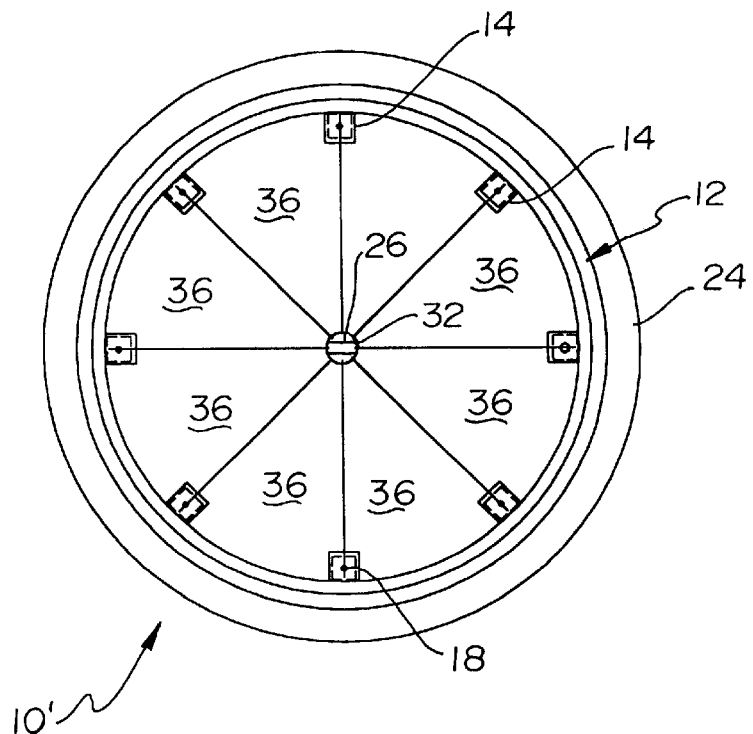
FIG. 3 is a top plan view of the second embodiment of cap.

The cap 12 in the preferred embodiment shown at FIG. 2, is of fiberglass reinforced sections which form ribs 34 which are joined together by a fabric component 38 to form the cap 12. A second embodiment, FIG. 3, provides sections 36 formed entirely of fiberglass. Additionally metal or other resilient materials could be used. In both embodiments, the liquid sealing skirt 16 portion of the cap assembly 10 is formed of fiberglass reinforced product although other materials could be used. The anchors 22 are of concrete although other inexpensive, heavy materials could be used.

Cap assembly 10 is shown with a generally concave shape along an X axis. Because cap assembly 10 fits inside tank 24, cap assembly 10 is the same general perimeter shape as the interior wall of tank 25, in this case, a circle. In cap assembly 10, cap 12 is of a smaller diameter than the interior wall 25 of tank 24. Attached to cap 12 and forming a continuous seal with cap 12, is liquid sealing skirt 16. Formed at a lower edge of sealing skirt 16 is a flange 30 which comes to rest atop corbel 20. Because skirt 16 comes into contact with corbel 20, cap assembly 10 is prevented from coming to rest on tank bottom 28. Additionally, skirt 16 is shaped to fit the predetermined situation. Skirt 16 length is dependent on where in the side of interior wall 25 corbel 20 is positioned. Skirt 16 length is dependant on where in the side of interior wall 25 corbel 20 is positioned, to accommodate the low liquid level 50 within tank 24, illustrated at FIG. 1, and skirt 16 length is also at FIG. 4. Other factors, such as the amount of gas to be stored, must be considered when determining the required length of skirt 16. In the preferred embodiment, skirt 16, including flange 30, is of fiberglass materials. These materials are preferred because they provide stability and strength to cap 12 without adding needless weight, although other materials could be used.

Mounted atop cap 12 are a series of anchor attachments 14 consisting, in the preferred embodiment, of a frustum 15, having an aperture formed centrally therein for receipt of a cable 18, although any shape could be used so long as it is of the size to support the weight of the attached cable 18 and anchor 22. Cable 18 is fastened at a first end to frustum 15 by a bolt, screw and nut, or other fastening means. Second end of cable 18 has attached thereto an anchor 22 which acts as ballast when in its position of use, holding cap 12 on tank 24.

Also mounted atop cap 12 is compression ring 32 which has a handle 26 or other attachment means shown in FIGS. 2–3 provided as an attachment point permitting cap 12 to be lifted into place during installation on collection tank 24 and to permit cap assembly 10 to be removed for either cleaning of tank 24, to remove anchors 22 for replacement or repair of the tank mechanism. When the liquid sealing skirt 16 rests on the corbel 20, the cable 18 goes slack and permits easy detachment of the anchors 22 allowing removal of the cap assembly 10.

FIG. 3 illustrates a top plan view of second embodiment cap assembly 10', having a series of sections 36 of fiberglass material interconnected by ribs 34. The number of sections used depends on the size of the collection tank 24 for which the cap assembly 10 is manufactured. It is an innovation of this invention that this cap assembly 10 can be sized and used on a number of pre-existing digesters to retro-fit the digester with the new cap assembly 10 of this invention. Fiberglass sections 36 and fiberglass ribs 34 in either embodiment are mounted together by fastening means such as nuts and bolts. The series of anchor attachments 14 are positioned around the perimeter edge of cap 12 in both embodiments and are aligned in FIG. 3 with a seam between two fiberglass reinforced sections 36 in cap 12. Cap fastening means, compression ring 32, located centrally on cap 12, also attach sections 36 and 38 together to form cap 12. Sections 36 and 38 are attached to compression ring 32 by additional fastening means such as nuts and bolts. Because cap assembly 10 does not fit tightly within tank 24, a gap 42 is shown in FIG. 1.

Because both embodiments of the cap assembly 10 are able to be totally disassembled, they permit easy repair of one or more cap sections 36 or 38 or recycling of the entire cap assembly 10 by disassembly for removal to a different site. Additionally, because the cap assembly 10 can be removed, use of this cap system 10 reduces costs to the user because training for employees and special equipment for cleaning, maintenance and repair of a digester is unnecessary. The gas may be bled off form the tank 24 through the input and/or output spigots in the tank 24. The gas is bled off, may be used or recycled in some form. After the gas is bled off, the cap 12 may be lifted by handle 26 for disassembly of the cap assembly 10, maintenance, repair or cleaning of tank 24. The tank 24 does not need to be emptied prior to this work. No work must be done in the enclosed space of the tank 24 thus reducing training costs of employees.

Figure 4:
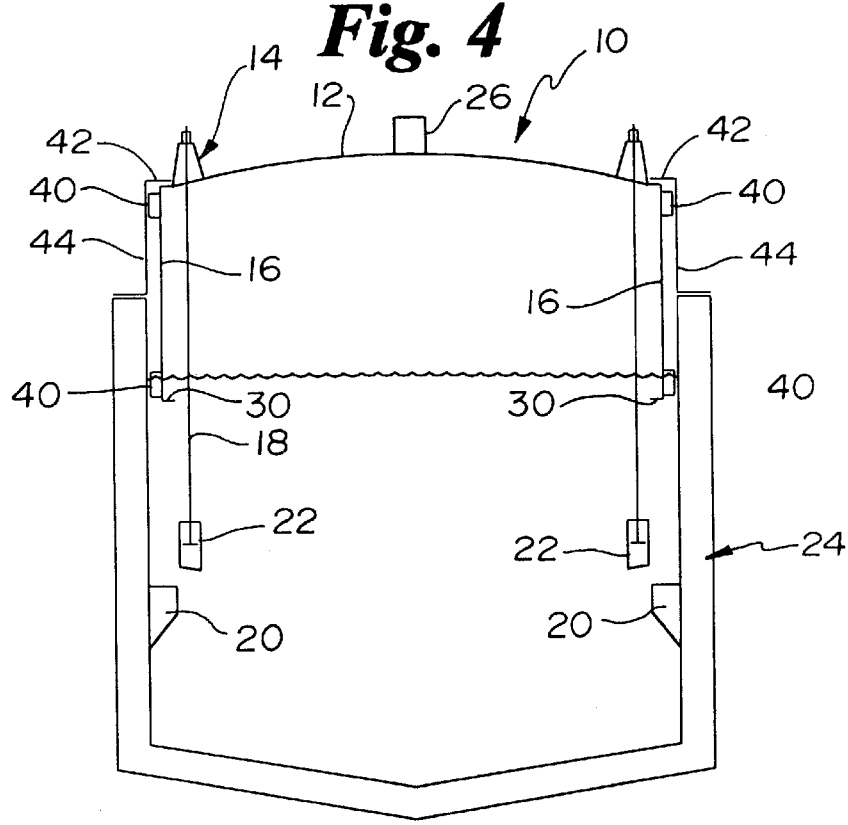
FIG. 4 is a cross-sectional view of the device of the invention in a high liquid level environment.

In use, the dimensions of the cap assembly 10 are determined to accommodate the use of a specific collection tank 24. Because cap assembly 10 can be adjusted vertically to accommodate differing amounts of internal gas in the tank 24, it allows for storage of a large amount of gas even when the tank 24 is totally full of liquid, FIG. 4. When the liquid level is near the top of the inner edge of tank 24, cap assembly 10 is raised vertically, as shown in FIG. 4. Skirt 16 can be made to accommodate any existing digester or collection tank. Because the anchors 22 attached to the cap assembly 10 of this invention are attached so as to be continuously submerged, even when a high liquid is maintained raising cap assembly 10 to its extreme upward position, FIG. 4, increased amounts of gas are able to be accommodated while maintaining the intake pressure. In addition to the cap 12 being able to be raised vertically above tank 24 by extension of cable 18, cap 12 is securely positioned on tank 24 by anchors 22. Skirt 16 is of such a length to maintain the liquid seal with the liquid within tank 24. Skirt 16 length is dependant on where in the side of interior wall 25 corbel 20 is positioned, to accommodate the low liquid level 50 within tank 24, illustrated at FIG. 1, and skirt 16 length is also able to accommodate a high liquid level 50', illustrated at FIG. 4. A maximum cap 12 height is maintained by a stop 42 positioned on tank 24. Other factors, such as the amount of gas to be stored, must be considered when determining the required length of skirt 16.

After the dimensions of cap system including cap 12, skirt 16 and anchors 22, have been determined, cap 12 is assembled by cap sections 36 being positioned adjacent each other and held by compression ring 32 and fastened by fastening means. Skirt 16 is attached below cap 12, also by fastening means. A crane or other lifting means is used to lift and position assembled cap 12 within the selected tank 24.

Although the present invention has been described in considerable detail with reference to certain preferred versions thereof, other versions are possible. Therefore, the spirit and scope of the appended claims should not be limited to the description of the preferred versions contained herein.

What is claimed is:

1. A cap assembly for covering a collecting and treating tank for holding liquids and gas having a vertically cylindrical tank with a bottom fixed to a bottom edge of a circular side wall, said cap assembly comprising:
    a vertically movable circular cap for receipt by the top edge of the cylindrical tank;
    a series of removable anchors, connected to said cap by cables, for permitting said cap to be adjusted for different pressures by using different anchor weights, to accommodate a change in pressure within the tank; and
    means for restricting horizontal movement of said cap to prevent tipping of said cap in the wind.

2. The assembly of claim 1, wherein said cap has at least one handle fixed to an upper surface thereof for temporary attachment to means for lifting said cap vertically above said tank for installation, and further for removal of said cap from the tank to permit cleaning and maintenance of the tank.

3. The assembly of claim 2, wherein said means for restricting horizontal movement of said cap further comprised by said anchors positioned within said tank remote from said cap, thereby providing a low center of gravity to said cap such that the tendency of said cap to tip in the wind is reduced.

4. The assembly of claim 3, wherein said cap can be removed to adjust the size of the anchors to retro-fit the system to accommodate liquids and gas having different predetermined pressures.

5. The assembly of claim 4, further comprising means for continuously submerging said anchors in the liquid permitting increased amounts of gas to be maintained above the liquid at a pressure similar to the intake pressure.

6. The assembly of claim 5, further comprising means for restricting horizontal movement of said cap within said tank by a combination of anchoring effect of said cables, said upper edge of said tank, and guide rollers.

7. A cap assembly for a collecting and treating tank for digesting sewage sludge having a vertically cylindrical tank with a bottom fixed to a bottom edge of the circular side wall, said cap assembly comprising:
    a vertically movable circular cap for receipt by said top edge of the cylindrical tank;
    a series of removable anchors, connected to said cap by cables, for permitting said cap to be adjusted for different pressures by using different anchor weights, to accommodate a change in pressure within the tank;
    means for adjusting the size of said series of anchors to retro-fit the system to accommodate liquids and gas having different predetermined pressures; and
    means for restricting horizontal movement of said cap.

8. The assembly of claim 7, wherein said means for adjusting the size of the anchors to retro-fit the system to accommodate liquids and gas having different predetermined pressures further comprise a series of removable anchors connected to said cap by cables for permitting the cap to be adjusted within said tank to accommodate different pressures by using different anchor weights.

9. The assembly of claim 8, further comprising means for continuously submerging said anchors in the liquid permitting increased amounts of gas to be maintained above the liquid at a pressure similar to the intake pressure.

10. The assembly of claim 9, wherein said means for restricting horizontal movement of said cap within said tank further comprise a combination of anchoring effect of said cables, said upper edge of said tank, and guide rollers.

11. The assembly of claim 10, further comprising means for providing a generally lower center of gravity to said cap, thereby reducing the tendency of said cap to tip by atmospheric conditions.

12. In a sewage collecting and treating tank for holding liquids and gas, having a vertically cylindrical tank having with a bottom fixed to a bottom edge of a circular side wall and a top edge of the circular side wall, said tank comprising:
    a vertically movable circular cap received by the top edge of said cylindrical tank;
    means for temporary removal of said cap for cleaning, maintenance, and relocation of said cap;
    means for restricting horizontal movement of said cap; and
    means for removing said cap to permit adjusting the size of the anchors to retro-fit the system to accommodate liquids and gas having different predetermined pressures.

13. The assembly of claim 12, wherein said means for temporary removal of said cap for cleaning, maintenance, and relocation of said cap further comprise a series of removable anchors connected to said cap by cables, for permitting said cap to be adjusted vertically within the tank to accommodate different pressures by using different anchor weights, said series of removable anchors further comprise means for temporary removal of said cap for cleaning the interior of the tank, for maintenance within said tank, and for disassembling of said cap for relocation.

14. The assembly of claim 13, wherein said means for restricting horizontal movement of said cap within said tank further comprise a combination of anchoring effect of said cables, the upper edge of the tank, and guide rollers.

15. The assembly of claim 14, further comprising means for providing a generally lower center of gravity to said cap reducing the tendency of said cap to tip by atmospheric conditions.

16. A cap assembly for a collecting and treating tank for digesting sewage sludge having a vertically cylindrical tank with a bottom fixed to a bottom edge of a circular side wall, said cap assembly comprising:
    a vertically movable circular cap received by a top edge of said cylindrical tank;
    a liquid sealing skirt;
    a series of removable anchors, connected to said cap by cables, for permitting said cap to be adjusted vertically within the tank; and
    means for adjusting said cap assembly vertically within the tank to accommodate different amounts of gas without generally increasing the pressure within the tank.

* * * * *